United States Patent Office 3,255,626
Patented June 14, 1966

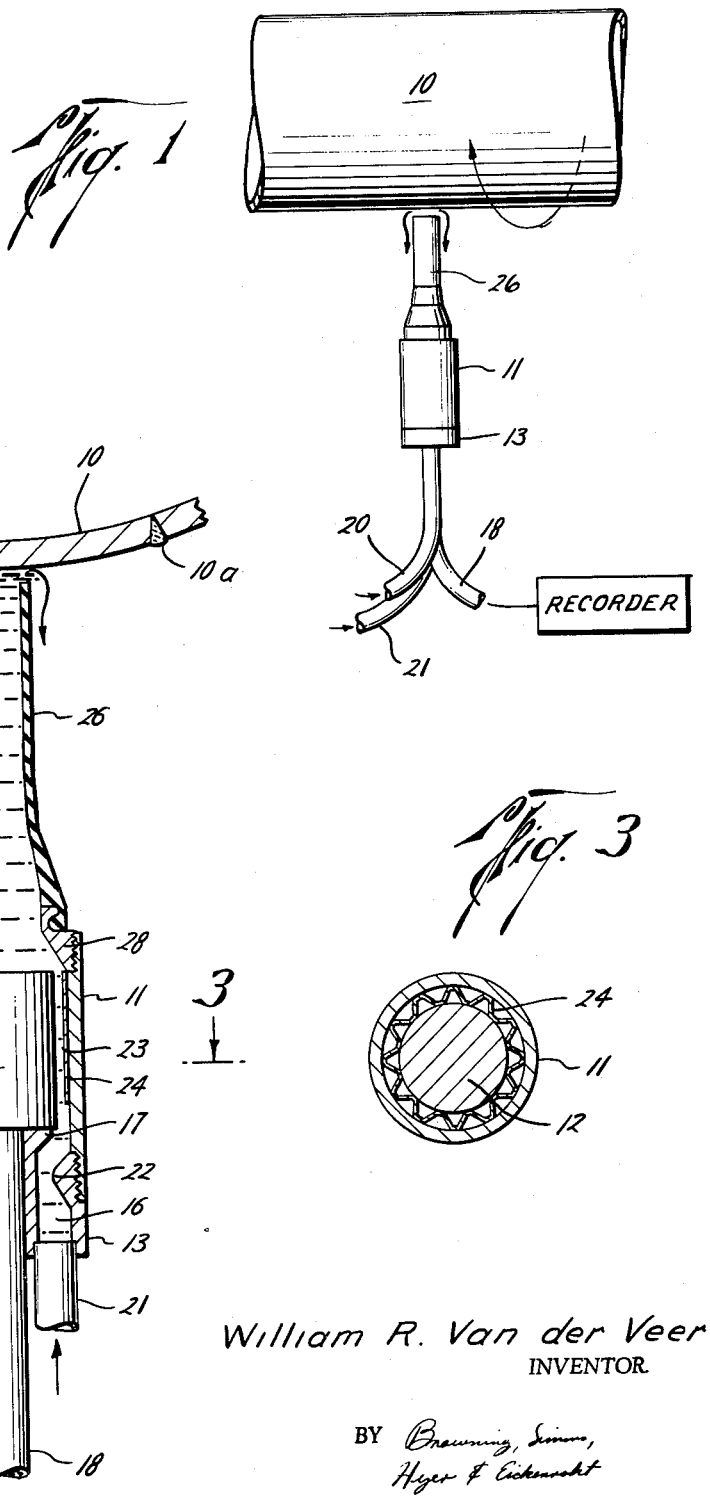

3,255,626
ULTRASONIC APPARATUS
William R. Van der Veer, San Antonio, Tex., assignor to Southwest Research Institute, San Antonio, Tex., a trust estate organized under the laws of Texas
Filed Mar. 29, 1963, Ser. No. 269,014
1 Claim. (Cl. 73—71.5)

This invention relates generally to nondestructive inspection or inspection employing ultrasonic techniques and, in particular, to apparatus for providing a liquid coupling between an ultrasonic transducer and an object being inspected.

To inspect an object using ultrasonic waves, some means must be provided to transmit the ultrasonic waves between the transducer and the object being inspected. Since liquids are a good media for transmitting this wave energy, it has been customary in the past to submerge the transducer or transducers and the object to be inspected, or at least that part of the object being inspected, in the liquid medium. In this way, since the object being inspected and the transducer were both entirely covered with the liquid, there was no difficulty in maintaining a liquid couplant through which the ultrasonic wave could travel between the transducer and the member. This system worked as long as the object being inspected was not too large. However, it was completely impractical when the object being inspected was of any size at all such as, for example, large diameter pipe.

For such large objects, it was heretofore the practice to mount the transducer in a suitably shaped container which had an opening shaped to closely match the contour of the object and, by keeping the container filled with liquid, to attempt to maintain a fluid seal sufficient to keep the container full and a liquid coupling between the transducer and the object. This method had the inherent disadvantage of requiring a close fit between the edges of the container and the surface of the object being inspected which made it impossible to accommodate large surface defects and protrusions such as weld beads, gouges or changes in contour, without losing the liquid coupling. Since a break in the fluid connection between the transducer and the specimen interrupts the inspection process, this method was unsatisfactory.

Another method sometimes suggested for coupling the transducer to the object employed a housing for the transducer which had an outlet equipped with a nozzle. The liquid was introduced into the housing under pressure so that it would be expelled through the nozzle toward the surface of the object as a high velocity, uncontained stream or jet of liquid. The transducer was located in the housing so that the ultrasonic waves could travel to the object through this high velocity stream of liquid. This system has serious disadvantages which become particularly apparent when used with focused beam transducers which are physically positioned a substantial distance from the object being tested in order to obtain the desired beam characteristics for that portion of the beam in the object. For example, the nozzle produced considerable turbulence in the flowing stream of liquid which caused the focused beam to become diffuse. Also, relatively high flow rates of the liquid were required in order to obtain the jetting action and the resulting large quantities of liquid caused a disposal problem and resulted in messy working conditions.

It is an object of this invention to provide apparatus for maintaining a liquid couplant between a source of ultrasonic waves and an object being inspected which maintains the liquid coupling in such a way that a minimum of turbulence is produced in the liquid.

It is also an object to provide apparatus for coupling a transducer to an object being inspected which allows a continuously flowing liquid to enter the apparatus at a point below the transducer to insure the flow of liquid in the column thereof between the transducer and object is always in a direction parallel to that of the ultrasonic wave travel, thereby minimizing turbulence and defocusing of the ultrasonic beam.

It is a further object to provide means located between the point of entrance of the liquid and the active face of the transducer to reduce any turbulence in the liquid before it enters the space between the transducer and the object being inspected and to assure that the flow is a more or less uniform laminar type of flow.

To accomplish these and other objects which will be apparent from the detailed description of the invention below, the transducer is mounted in a housing in such a manner that the liquid used to transmit its ultrasonic waves to or from the object being inspected can be introduced at a point below the transducer so that most of the turbulence in the entering liquid can be dissipated before the liquid reaches the space between the transducer and the object being inspected. In the preferred embodiment, to further reduce the turbulence in the liquid between the point where it enters the housing and the area above the transducer, and to assure a more or less uniform laminar flow between the transducer and the object, a venturi passage and a plurality of longitudinal partitions are provided. The venturi passage tends to equalize the flow of liquid so that its velocity is uniform on all sides of the transducer which aids in the reduction in turbulence. The longitudinal partitions divide the flowing stream into a plurality of separate streams of relatively small cross section which effectively eliminates any turbulence due to swirling of the liquid after it passes through the venturi passage. These partitions are located circumferentially around the transducer so that the independent streams formed by the partitions will be discharged uniformly around the upper end of the transducer, thus insuring that the composite stream flowing from the transducer to the object will have a minimum of turbulence.

The invention will now be described in connection with the accompanying drawings in which:

FIG. 1 is a view in elevation showing the apparatus of this invention in position to inspect a section of pipe;

FIG. 2 is a vertical cross section taken through the apparatus of FIG. 1 illustrating the inner construction thereof; and FIG. 3 is a sectional view taken along lines 3—3 of FIG. 2.

As illustrated in FIG. 1, the apparatus is in the process of inspecting a pipe specimen indicated by the number 10. As best seen in FIG. 2, the apparatus comprises a housing 11 within which a transducer assembly 12 is mounted by means of end member 13. The end member has an extension 17 which extends into housing 11 and supports the transducer 12 in the center of the housing so that an annular space 23 is provided between the transducer and the housing. The transducer is held in place by means of the electric cable 18 which extends through an opening 15 in the end member. A set screw 19 is provided to hold the transducer in place on the end of extension 17. The end member is connected to cylindrical housing 11 by means of threads 30. In addition to the opening for the electric cable, openings 14 and 16 are provided through which liquid is introduced into housing 11 by means of hoses 20 and 21. Located between the point where the liquid enters the end member and where it leaves to enter annular space 23 is an annular restriction 22 shaped in longitudinal cross section as a venturi passage. The venturi passage provides an annular restriction which tends to even out differences in flow velocity across the cross section of the flow passage in the housing. Thus, with the liquid entering in two separate streams, there would be, without the venturi passage, a tendency for the liquid to flow at higher velocities in the vicinity of the inlets than elsewhere. Therefore, the venturi passage equalizes flow velocities so that they tend to become uniform all around the annular passage at the discharge end of the venturi passage. Thus, the two entering streams of liquid are united into one smoothly flowing, low turbulence stream as it enters the annular space 23. Two tubes are shown for supplying liquid. One could be used; however, this would cause the flow velocities below the venturi passage to be of a more uneven pattern but, by properly sizing the venturi passage, the flow of the liquid could be smoothed out even though only one tube is used to supply the liquid.

Located in the annular space 23 is a corrugated member 24, the corrugations of which extend from the inner wall of housing 11 to the transducer 12 in the manner illustrated in FIG. 3. These corrugations in effect produce longitudinal partitions which separate the liquid flowing past the transducer into small independent streams which are reunited above the transducer in chamber 31. From this chamber above the transducer, the liquid rises into elongated tubular member 26 which is molded around the grooved end of ring 28 which is in turn connected to the housing by means of threads 29.

The elongated tubular member 26 is preferably made from a material that is flexible, such as rubber, so that should an irregularity or protrusion on the surface of the member being inspected strike the end of the tubular member, no permanent damage would be done.

In operation, the apparatus is positioned at or near the lower side of the object being inspected so that the liquid flows generally upwardly. The end of tube 26 is positioned the proper distance from the object being inspected so as to avoid contact with surface irregularities on the object as the latter is moved past the tube. For example, a weld bead 10a is shown in FIG. 2 and the "standoff" of the tube 26 should be sufficient that this bead will not strike the tube as the bead is moved past the tube. This distance on most occasions can be from approximately ⅛ to ¼ of an inch but may be as much as ½ of an inch. Liquid is forced into the device by means of hoses 20 and 21. The liquid entering at the lower end of the apparatus passes through venturi tube 22 which eliminates a large percentage of any turbulence which existed in the incoming stream of liquid and combines it into one relatively smooth flowing stream before delivering it to the annular space 23. The liquid stream then passes through the plurality of individual passageways in the annular opening and enters chamber 31 located above the transducer. It then slowly rises through flexible tubular member 26 and spills over the end, simultaneously engaging the wall of the member being inspected. Of course, the liquid must be supplied at a rate sufficient to maintain the space between the tube and the member being inspected completely filled with liquid. The rate of flow should be kept at a minimum. In fact, the flow rate should be such that there is only a gentle overflow much like that from a garden hose when its end is pointed upward and the flow rate is very low. Thus, there is no jetting action as such but merely a smooth overflowing action.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

Apparatus for maintaining a liquid coupling between a transducer assembly and an object to be inspected by ultrasonic waves generated and/or received by the transducer assembly, comprising a body having a passageway with an inlet and an outlet, means for connecting the inlet to a source of liquid, the outlet being adapted to be positioned adjacent the object to be inspected;

a transducer assembly mounted in the passageway intermediate the inlet and outlet and spaced from the walls of the passageway to provide an annular flow path for the liquid around the transducer assembly;

a venturi restriction located in the passageway between the transducer assembly and the inlet; and a plurality of partitions between the transducer assembly and the body and extending longitudinally of the transducer assembly to divide the flowing liquid into a plurality of individual streams as it flows through the annular space.

References Cited by the Examiner

UNITED STATES PATENTS

| 2,163,730 | 6/1939 | Goetzl | 73—211 |
| 2,751,783 | 6/1956 | Erdman | 73—67.8 |
| 3,068,370 | 12/1962 | McInnish | 73—67.8 |

OTHER REFERENCES

Goldman, Richard: Ultrasonic Technology, Reinhold, New York, 1962. In Patent Office Scientific Library TA367G6, pp. 173-4 relied upon.

"Engineering Information on Venturi Meter Tubes," Technical Bulletin 110–P1, B–I–F Industries, Inc. Copy in 73–213.

RICHARD C. QUEISSER, *Primary Examiner*.

DAVID SCHONBERG, L. R. FRANKLIN,
*Assistant Examiners.*